March 31, 1925.

1,531,853

C. R. FISHER

MOTOR CONTROL SYSTEM

Filed Feb. 27, 1922

Inventor

Charles R. Fisher

By Whittemore Hulbert Whittemore
+Belknap   Attorneys

Patented Mar. 31, 1925.

1,531,853

UNITED STATES PATENT OFFICE.

CHARLES RICHARD FISHER, OF ROGERS CITY, MICHIGAN.

MOTOR-CONTROL SYSTEM.

Application filed February 27, 1922. Serial No. 539,670.

*To all whom it may concern:*

Be it known that I, CHARLES R. FISHER, a citizen of the United States of America, residing at Rogers City, in the county of Presque Isle and State of Michigan, have invented certain new and useful Improvements in Motor-Control Systems, of which the following is a specification, reference being had therein to the accompanying drawings.

The invention relates to a method of controlling reversing direct current motors and is more particularly concerned with the type of control known as the Ward-Leonard system which has been used for controlling the movement of battle ship turrets, high duty mine hoists, electric shovels etc. In this system, each motor is provided with an individual generator and the speed of the motor is controlled entirely by varying the resistance in the shunt field of its generator. The generator is also provided with a differential series field which tends to buck the generator voltage so that if the motor is stalled because of an excessive load, the differential series field bucks the generator electromotive force down to a safe value such that the current flowing through the motor windings will not cause the same to burn out. In order to reverse the motor, it has been the custom to provide a switch for reversing the current through either the field or the armature of the motor. This switch is usually operated electromagnetically by means of a control lever and the arrangement is such that when no voltage is being produced by the generator, the motor is disconnected from the circuit. Upon the initial operation of the controller arm for varying the resistance of the shunt field of the generator, the switch is electromagnetically closed in order to connect the motor in the circuit. Upon further operation of the controller arm, the resistance in the shunt field is lowered, thus increasing the generated voltage and the current supplied to the motor. When the controller is operated slowly, this system is satisfactory as no electromotive force is built up in the generator until the external circuit of the generator through the motor has been completed. However, if the control lever is operated quickly, the electromotive force from the generator is often built up to a high value before the electromagnet operates the switch for completing the circuit. This is due to the fact that it takes an appreciable time to operate the switch electromagnetically. When the electromotive force is built up in this way, it causes a large current to be sent through the motor at the moment the contact is made and this is detrimental to the motor and to the switch and requires large capacity units to prevent them from being burned out.

One of the objects of my invention is to do away with this excessive current at the moment of contact of the switch when the controller is operated quickly. Another object of the invention is to have a continuous current through the field windings of the motor which amounts to only a small percentage of the full load current. Other objects of the invention reside in the novel features of construction and combinations and arrangements of parts as more fully hereinafter set forth.

In the drawings:—

Figure 2:
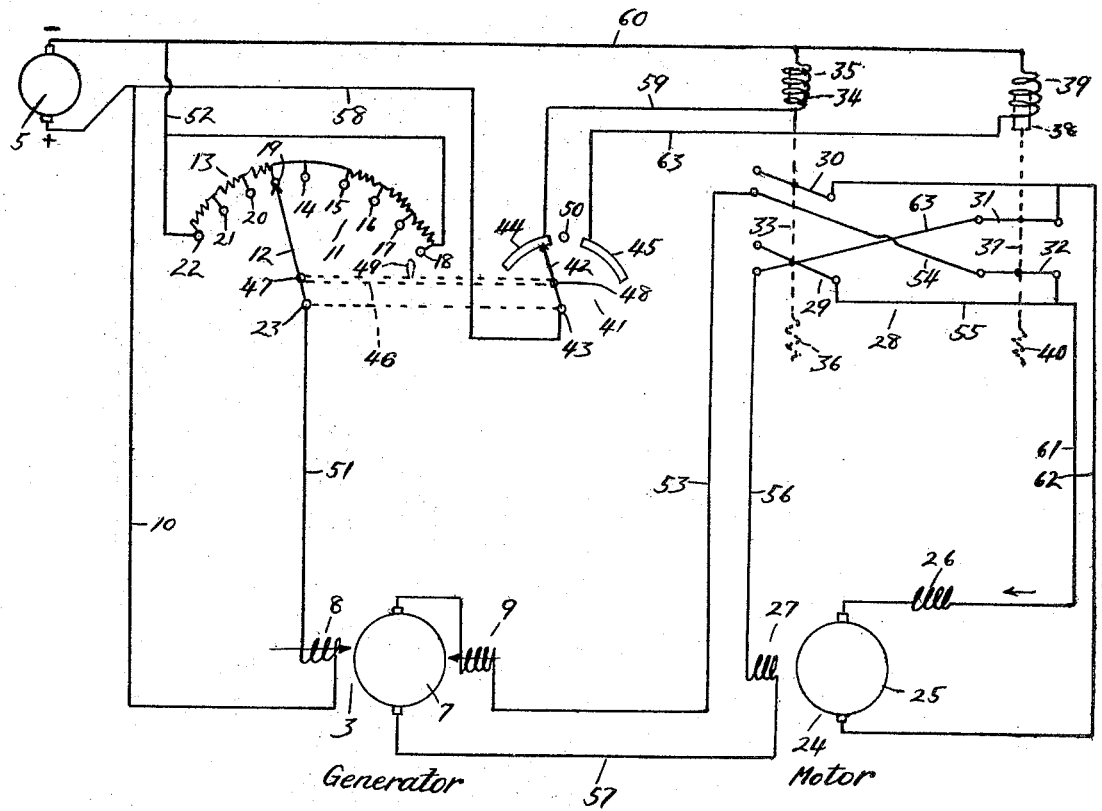
Figure 2 is a diagrammatic illustration of the electrical system embodied in this invention.
Figure 1:
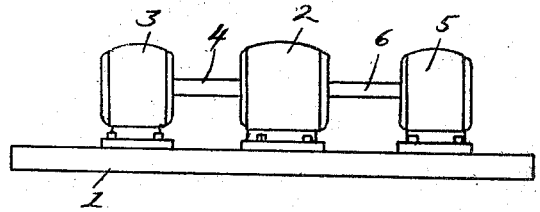
Figure 1 represents a motor generator set.

1 represents the base of a motor generator set on which is mounted a motor 2 usually of the synchronous type adapted to run at substantially constant speed. 3 is a direct current generator directly connected to the motor 2 by means of the shaft 4. 5 is also a direct current generator connected to the motor 2 by means of the shaft 6. The generator 5 is designed to be used as an exciter for the generator 3 and also may be used to supply current to the solenoid coils hereinafter described.

The generator 3 consists of an armature 7, a shunt field 8 and a differential series field 9. The shunt field 8 is preferably connected to the exciter 5 by means of the circuit 10 although if desired the separate exciter may be eliminated and the field 8 connected in parallel with the armature 7, these arrangements being equivalents which are well understood in the art. The circuit includes a rheostat 11 comprising a control arm 12 and a resistance 13. A plurality of contact buttons 14 to 22 inclusive are connected to the resistance and the arm 12 swinging on the pivot 23 is adapted to contact with the contact buttons.

24 is a reversing motor comprising an armature 25, a commutating field 26 and a series field 27. 28 is a switching device consisting of the contactors 29, 30, 31 and 32. The contactors 29 and 30 are operated by a rod 33 on the end of which is placed a core 34 surrounded by a solenoid 35. A spring 36 connected with the other end of the rod 33 serves to keep the contactors 29 and 30 normally closed. Similarly the contactors 31 and 32 are operated by the rod 37 having at its upper end the core 38 within the solenoid 39 and being provided at its opposite end with a spring 40 which serves to keep the contactors 31 and 32 normally closed. 41 is an auxiliary controller comprising the controller arm 42 adapted to swing about the pivot 43 and the segment shaped contact arms 44 and 45. The controller arms 12 and 42 are connected by a cross link 46 pivotally connected to the arm 12 at 47 and to the arm 42 at 48. 49 is a handle on the link 46 adapted to operate the arms 12 and 42 by means of the link 46. The controllers 11 and 41 may be of any suitable design for carrying out the functions hereinafter described, and they may be constructed in a number of different ways, but they are diagrammatically shown separately in the present drawings in order to clearly illustrate the electric circuits.

The operation of the electrical system is as follows: The neutral position of the controller arm 12 is in contact with the button 14 and when in this position the contact arm 42 of the controller 41 is in the position 50. With the controller arm 12 in this position, the current from the exciter 5 flows through the conductor 10, the shunt field 8 of the generator 3, the conductor 51, the control arm 12, the resistance 13 and the conductor 52, completing the circuit. Thus the shunt field 8 is excited and an electromotive force is generated across the terminals of the armature 7. The current from the armature 7 flows through the differential series field 9 and conductor 53 to the switch 28. All of the contactors 29, 30, 31 and 32 of the switch 28 are now closed due to the actions of the springs 36 and 40 because the solenoids 35 and 39 are not operating when the controller arm 42 is in the position 50. Thus the current passes from the conductor 53 through the conductor 54, the contactor 32, the conductor 55, the contactor 29, the conductor 56, the motor field 27 and the conductor 57 to the armature 7 completing the circuit. Thus it will be seen that the motor field 27 is excited, but that the armature 25 does not receive current because the switch 28 shunts the current around the armature. However, the current in this circuit is kept down to a safe value because it flows through the differential series field 9 of the generator which bucks the shunt field 8.

When the control arm 12 is moved to the left to the position shown in full lines in Figure 2, the control arm 42 is moved correspondingly and contacts with the segment shaped contact 44. In this position, the current flows through the shunt field 8 of the generator 3 in the same manner as previously described. In addition, however, current flows from the exciter 5 through the conductor 58, the controller arm 42, the segment shaped contact 44, conductor 59, the solenoid 35 and the conductor 60, thus completing the circuit. This energizes the solenoid 35 which withdraws the core 34 against the action of the spring 36 and causes the contactors 29 and 30 to open. The contactors 31 and 32, however, still remain closed. In this position of the switch 28, the armature of the motor 25 is connected in series with the field 27, the circuit being as follows: The current from the generator armature 7 flows through the coil 9, conductor 53, conductor 54, contact arm 32, conductor 61, commutating field 26, motor armature 25, conductor 62, contactor 31, conductor 63, conductor 56, field 27, conductor 57 to the armature 7, thus completing the circuit. The current now passes through both the field and the armature of the motor causing the armature to rotate. When the contact arm 12 is moved farther to the left, it cuts out part of the resistance 13 in series with the shunt field 8 of the generator, thus causing a greater current to flow through the shunt field 8. This in turn generates a higher electromotive force across the armature 7 of the generator and in turn increases the speed of the motor 24.

When the controller arm 12 is moved to the right of the contact button 14, the controller arm 42 is moved correspondingly to the right and contacts with the segment shaped contactor 45. In this position, the current from the exciter 5 passes through the solenoid 39 by means of the following circuit: Conductor 58, control arm 42, segment shaped contact 45, conductor 63, solenoid 39 and conductor 60. Thus the contactors 31 and 32 are opened while the contactors 29 and 30 are closed. This causes a reversal of the current in the armature 25, while the direction remains the same in the field 27. Thus, the armature 25 is caused to rotate in the reverse direction.

With the electrical arrangement herein described, when the controller arm 12 is in the neutral position 14, there is a continuous circuit from the generator 3 through the field of the motor 24, but the current in this circuit is kept down to a safe value by means of the differential series field 9. Thus if the control arm 12 is moved quickly to the extreme position either to the right or to the left of the neutral position, the maximum electromotive force may be generated by the generator 3, due to the shunt field 8 before the contactors of the switch 28 are opened. This is due to the fact that it takes an appreciable time before either of the solenoids 35 or 39 will operate the contactors. However, this high electromotive force across the terminals of the armature of the generator causes an increased current flow through the differential series field 9 which will in turn generate an electromotive force counteracting the electromotive force from the shunt field 8 and the two fields will cooperate to keep the current value down to a safe value. When one of the solenoids finally become sufficiently energized to operate one set of the contactor, the motor armature will be connected to the circuit but the switching will occur with only a low current value.

What I claim as my invention is:—

1. The combination with a motor, having an armature and a field winding, of a generator, a continuously closed circuit including said generator and the field winding of said motor, and means for reversely connecting said armature in said circuit in series with said motor field winding to operate said motor in reverse directions.

2. The combination with a motor, having a field winding and an armature, of a generator having a field winding, a continuously closed circuit including said generator and the field winding of said motor, means for reversely connecting said armature in said circuit in series with said motor field winding to operate the motor in reverse directions, and means for varying the current in the field winding of said generator to control the speed of said motor.

3. The combination with a motor, having an armature and a field winding, of a generator comprising a main field winding and a differential series field winding, a continuously closed circuit including the differential series field winding of said generator and the field winding of said motor, means for reversely connecting the armature of said motor in said circuit in series with said motor field winding to operate said motor in reverse directions, and means for controlling the current in the main field winding of said generator to regulate the speed of said motor.

4. The combination with a motor, having a field winding and an armature, of a generator comprising a main field winding and a differential series field winding, a rheostat in series with said main field winding, a continuously closed circuit including the differential series field winding of said generator and the field winding of said motor, means for reversely connecting the armature of said motor in said circuit in series with said motor field winding to operate said motor in reverse directions, and means for regulating said rheostat to control the speed of said motor.

5. The combination with a motor, having a series field winding and an armature, of a generator for supplying current to said motor, a continuously closed circuit including said generator and the field winding of said motor, and movable means for controlling the speed and the direction of rotation of said motor.

6. The combination with a motor, having a field winding and an armature, of a generator having a field winding, a continuously closed circuit including said generator and the field winding of said motor, means for reversely connecting the armature of said motor in said circuit, means for varying the current in the field winding of said generator, and a controller operatively connected to both of said means for regulating both the speed and the direction of rotation of said motor.

7. The combination with a motor, having a field winding and an armature, of a generator having a main field winding and a differential series field winding, a switch, a continuously closed circuit including said differential series field winding, said motor field winding and said switch, a controller for operating said switch to reversely connect the armature of said motor in said circuit, a rheostat in series with the main field winding of said generator, a second controller for adjusting said rheostat to regulate the current in said main field winding, and movable means operatively connected to both of said controllers for controlling both the speed and the direction of rotation of said motor.

8. The combination with a motor, having a field winding and an armature, of a generator having a field winding, a switching system having a plurality of sets of contactors, a circuit including said generator, the field winding of said motor and said switching system, means for automatically closing all of said contactors to complete said circuit by shunting the armature of said motor, and means for alternatively operating said sets of contactors to reversely connect the armature of said motor in said circuit to operate said motor in reverse directions.

9. The combination with a motor, having a field winding and an armature, of a generator for supplying current to said motor, a switching system having a plurality of sets of contactors, a circuit including said generator, said motor field winding and said switching system, means for automatically closing all of the contactors of said switch to complete said circuit through said switch and shunt the current around the motor armature, means for alternatively opening said sets of contactors to reversely connect the armature of said motor in said circuit to operate said motor in reverse directions and a controller for controlling the operation of said contactors.

10. The combination with a motor, having an armature and a series field winding, of a generator, a continuously closed circuit including said generator and the field winding of said motor, and means for reversely connecting said armature in said circuit to operate said motor in reverse directions.

11. The combination with a motor, having an armature and a series field winding, of a generator comprising a main field winding and a differential series field winding, a continuously closed circuit including the differential series field winding of said generator and the series field winding of said motor, means for reversely connecting the armature of said motor in said circuit to operate said motor in reverse directions, and means for controlling the current in the main field winding of said generator to regulate the speed of said motor.

12. The combination with a series wound motor, having an armature and a field winding, of a generator for supplying current to said motor, a reversing switch between said armature and said field winding, a continuously closed circuit including said generator and the field winding of said motor, means for operating said reversing switch to reversely connect said armature in series with said field, and means for controlling the current produced by said generator to regulate the speed of said motor.

13. The combination with a motor, having an armature and a field winding, of a generator for supplying current to said motor, a continuously closed circuit including said generator and the field winding of said motor, means for reversely connecting the armature of said motor in said circuit in series with said motor field winding to operate said motor in reverse directions, and means for varying the current produced by said generator to control the power of said motor.

14. The combination with a motor, having an armature and a series field winding, of a generator having a field winding, reversing switching means interposed between the armature and the field winding of said motor, a continuously closed circuit including said generator, said motor field winding and said reversing switching means, and means for operating said switching means to reversely connect the armature of said motor in said circuit.

15. The combination with a motor, having an armature and a series field winding, of a generator for supplying current to said motor, switching means having a plurality of sets of contactors interposed between the armature and the series field winding of said motor, a circuit including said generator, said motor field winding and said switching means, means for automatically closing one set of the contactors of said switching means to complete said circuit through said switching means and shunt the current around the motor armature thereby de-energizing said motor, means for alternatively opening said sets of contactors to reversely connect the armature in said circuit to operate said motor in reverse directions and a controller for controlling the operation of said contactors.

In testimony whereof I affix my signature.

CHARLES RICHARD FISHER.